United States Patent [19]
Ishikawa et al.

[11] 4,451,187
[45] May 29, 1984

[54] MACHINE TOOL

[75] Inventors: Michio Ishikawa; Kiyoshi Sasaki, both of Nagoya, Japan

[73] Assignee: Brother Kogyo Kabushiki Kaisha, Nagoya, Japan

[21] Appl. No.: 347,539

[22] Filed: Feb. 10, 1982

[30] Foreign Application Priority Data

Feb. 18, 1981 [JP] Japan ................. 56-23416

[51] Int. Cl.³ ............... B23C 9/00; B23B 39/00
[52] U.S. Cl. .................. 409/187; 408/11; 408/17; 409/186; 409/194
[58] Field of Search ............. 29/56.5; 409/186, 187, 409/194, 133; 408/11, 17, 10, 13

[56] References Cited

U.S. PATENT DOCUMENTS

| 3,451,293 | 6/1969 | Takezawa | 408/17 |
| 3,545,310 | 12/1970 | Porath et al. | 408/11 |
| 4,180,356 | 12/1919 | Hoch | 408/11 |

FOREIGN PATENT DOCUMENTS

479568 11/1975 U.S.S.R. ................. 408/17

Primary Examiner—William R. Briggs
Attorney, Agent, or Firm—Browdy & Neimark

[57] ABSTRACT

A machine tool comprising a rotary drive unit rotating a tool or workpiece, a load torque detecting device disposed between the rotary drive unit and the tool or workpiece rotated thereby, a linear drive unit moving one of the tool and the workpiece toward and away from the other, a main start switch for actuating the rotary drive unit, and a control device. The control device starts the rotary drive unit upon actuation of the main start switch; starts the linear drive unit to allow the tool to initiate a cutting operation on the workpiece when a variation in a load torque within a given period detected by the detecting device has decreased down to a first preset limit; and reverse the operating direction of the linear drive unit to interrupt the cutting operation if and when a difference between a load torque currently detected by the detecting device after the start of the linear drive unit and a load torque detected by the detecting device after the decrease of said variation to the first preset limit and before the initiation of the cutting operation, has exceeded a second preset limit.

18 Claims, 14 Drawing Figures

MACHINE TOOL

BACKGROUND OF THE INVENTION

This invention relates to a machine tool wherein a workpiece is machined with a tool by rotating either the workpiece or the tool and reciprocating one of the two.

The invention relates more particularly to a machine tool comprising a rotary drive unit for rotating either a tool or a workpiece, and a torque detecting device disposed between the rotary drive unit and the rotatably driven tool or workpiece, wherein a machining operation on the workpiece is interrupted in the event a load torque currently detected by the torque detecting device exceeds a calculated limit which is the sum of a preset maximum permissible cutting resistance and a load torque detected while no cutting load is being applied to the tool.

Some conventional machine tools of such type are equipped with a load detecting device which detects a drive torque applied to a drive motor or other rotary driving unit for rotating a tool, or to a rotation transmitting member disposed between the driving unit and the tool. The detected amount of drive torque is used to calculate a cutting resistance currently exerted on the tool during its advancement into the workpiece i.e., during a cutting operation. The advancing tool while cutting the workpiece is retracted from the workpiece when the calculated value of cutting resistance exceeds a predetermined maximum limit, whereby the tool is protected from possible breakage or damage.

With this type of load detecting device, the drive torque applied to the said rotary drive unit or rotation transmitting member is detected each time the tool has been rotated one or several turns, and the said cutting resistance exerted on the tool is commonly calculated in such manner that a drive torque value first obtained while no cutting load is applied to the tool, is subtracted from a drive torque value subsequently obtained while the tool is cutting the workpiece. The cutting operation of the tool on the workpiece is interrupted by withdrawing the tool from the workpiece when the thus obtained cutting resistance exerted on the tool has exceeded the predetermined limit.

Figure 1:
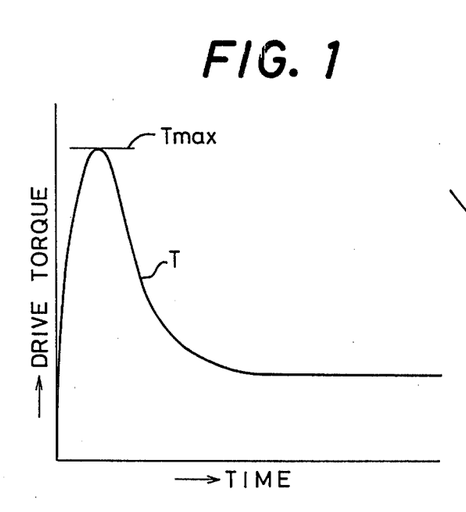
FIG. 1 is a graph showing a torque-time curve representing a driving torque of a transmission spring in an initial period of rotation of the spring.

In the art of the machine tool described above, it is also recognized that, upon starting a machining operation, the rotary drive unit is first actuated and a proper length of time is allowed for the drive torque value detected by the load detecting device to reach a substantially constant or steady level, before the drive torque value is obtained under non-cutting load condition, and then the tool is advanced for starting the machining operation on the workpiece. In the initial period of rotation of the rotary drive unit, the drive torque value rises steeply as shown in FIG. 1 even though no cutting load is exerted on the tool. After the torque value has reached the peak Tmax, it gradually falls into a lower stable range. Hence, if a reference drive torque value T0 under non-cutting load condition is detected or obtained while the drive torque value is in an unstable range wherein the value is gradually decreasing down to a steady level, the tool is retracted away from the workpiece when a drive torque value detected during a cutting operation exceeds a value Tmo which is the sum of the reference drive torque value T0 and a value Ts predetermined for protecting the tool from breakage or damage (hereinafter referred to as predetermined value Ts), in other words, when the cutting resistance Tx (=Tmo−T0) exceeds the predetermined value Ts (maximum permissible cutting resistance).

Figure 2:
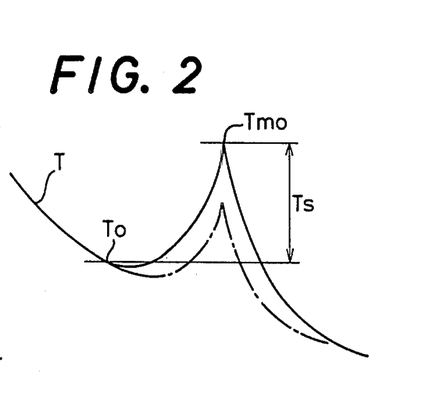
FIG. 2 is a graph showing a torque-time curve representing a driving torque of the same spring during a cutting operation of a tool.

When a cutting operation is started while the drive torque value remains in the unstable range, a true torque curve T turns out to be such as indicated by broken line in FIG. 2 because, within the range, the drive torque as a whole is in the process of gradual transition down to the stable range as the time lapses. This means that the calculation of a cutting resistance Tx based on a drive torque under non-cutting load condition, i.e., the said torque value T0, results in the fact that the drive torque detected during a cutting operation will not reach the torque value Tmo even when the actual cutting resistance exerted on the tool has exceeded the predetermined value Ts, whereby the cutting operation is not interrupted with the tool withdrawn from the workpiece and consequently the tool may be broken or damaged.

In view of the above problem in the art, the present applicants invented and proposed a machine tool for which was previously filed a Japanese patent application which was laid open as TOKU-KAI-SHO 56-114646, wherein the possible tool breakage or damage is avoided by preventing the tool from advancing for starting a cut until the drive torque under non-cutting load condition is stabilized. In the machine tool according to the invention disclosed in that previously filed application, the tool is advanced when the limit switch has detected, upon starting of a machining operation, that the drive torque value has decreased below a certain level or fallen into the said stable torque range. However, the use of the limit switch has a problem of short service life or durability and causes an additional problem that the said certain level of the drive torque fluctuate due to change in ambient temperature, which makes it difficult to determine whether the drive torque has fallen into the stable range or not.

SUMMARY OF THE INVENTION

It is accordingly a primary object of the present invention to provide a machine tool which is free of the above indicated problems, wherein a load torque is detected to determine whether the current value of the load torque has fallen into the stable range, and wherein the cutting operation on the workpiece is started only after the detected load torque value has fallen into the stable range so as to forestall possible breakage or damage of the tool during the cutting operation.

Another object of the invention is to provide a machine tool which is capable of displaying a variation in a torque value detected by torque detecting means in the initial period of rotation of a rotary drive unit for rotating a tool or workpiece to machine the workpiece, and thereby informing the operator of the timing when a second drive unit for reciprocating the tool or workpiece is advanced to start a machining cycle whereby the machining operation may be initiated safely with the operator being conscious of the said timing.

An preferred embodiment of a machine tool according to this invention comprises:

rotary drive means for rotating either a tool or a workpiece;

load torque detecting means disposed between the rotary drive means and the tool or workpiece driven thereby;

reciprocatory or linear drive means for effecting a relative movement between the tool and the workpiece;

a start switch for actuating the rotary drive means; and control means for controlling the rotary drive means and the linear drive means.

The control means starts the rotary drive means upon actuation of the start switch; starts the linear drive means in a direction to start machining the workpiece when a variation in a load torque detected by the detecting means has become smaller than a first preset value; and reverses the actuating direction of the linear drive means to withdraw one of the tool and the workpiece from the other in the event a difference between a load torque currently detected by the detecting means after the start of the linear drive means and a load torque detected by the detecting means after the said variation has become smaller than the first preset value and before the machining of the workpiece is started, has exceeded a second preset value.

Thus, to start a machining operation on the workpiece, the rotary drive means is first started and then the linear drive means is started, to allow the tool to initiate a cutting of the workpiece, only after the initially varying load torque value detected by the detecting means has been substantially stabilized, whereby the cutting torque actually applied to the tool during the cut may be exactly detected and consequently the machining operation may be accomplished with utmost safety without breakage or damage of the tool.

Contrary to a conventional practice that the linear drive means is actuated to start a cutting operation with a given length of time lapse after the actuation of the rotary drive means, the machine tool of the present invention is further advantageous in that the cutting operation can be initiated as soon as the initially varying load torque value detected by the detecting device has fallen into the stable range. This advantage is appreciated by considering the fact that the length of time needed for the initially varying load torque value to have been substantially stabilized becomes shorter as the machine repeats the cutting cycles. This means that the non-cutting time can be saved and consequently the total cutting time reduced with a result of increased machining efficiency.

A further advantage or feature of the machine tool of this invention lies in the provision of a display device which indicates the amount of decrease with respect to a reference value in the load torque detected by the torque detecting means before the tool starts machining the workpiece and thus permits the machine operator to observe the condition in which the detected load torque is gradually decreasing down to the steady level and easily expect the timing when the tool starts its cutting operation.

These and other objects and advantages of the invention may be readily ascertained by referring to the following description and the accompanying drawings.

DETAILED DESCRIPTION OF THE PREFERRED EMBODIMENTS

Referring now to the accompanying drawings, there are described in detail preferred embodiments of a drilling machine of this invention.

Figure 3:
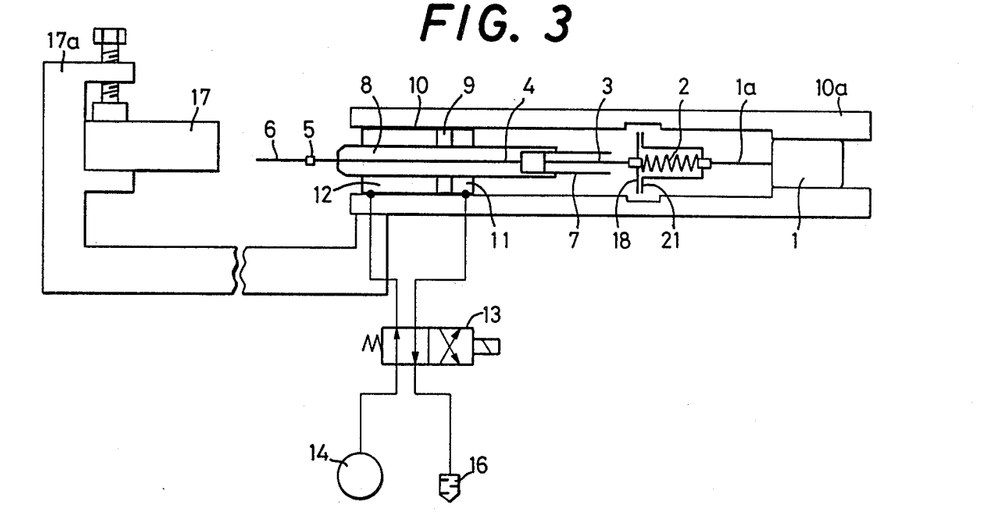
FIG. 3 is a schematic view illustrating the arrangement of a preferred embodiment of a drilling machine of the present invention.

In FIG. 3, is shown a three-phase induction motor 1 (hereinafter referred to as motor 1) serving as a rotary drive unit. The motor 1 is mounted on a machine frame 10a and its drive shaft 1a is connected and fixed to one end of a transmission spring 2 which serves as a member transmitting a rotary motion of the motor 1. The other end of the transmission spring 2 is connected and fixed to one end of a spline shaft 3 which is disposed in a line coaxial with the drive shaft 1a to transmit a driving power from the motor 1 to the spline shaft 3. A main spindle 4 carries at one end thereof a chuck 5 which accommodates and hold a drill 6 which serves as a cutting tool, and is provided at the other end with a sleeve portion 7 engaging the spline shaft 3 such that the shaft 3 is movable only in an axial direction thereof.

A main spindle sleeve 8 supports the spindle 4 rotatably but not axially movably, and is fixed, at its outer periphery, to a piston 9 received within an air cylinder 10 which constitutes, with the piston 9, a reciprocating or linear drive unit. The piston 9 divides the space within the cylinder 10 into a first air chamber 11 and a second air chamber 12. An electromagnetic valve 13 is operated through a later described control circuit to control the reciprocating or advancing and retracting movements of the piston 9, i.e., the spindle sleeve 8 such that the spindle sleeve 8 is advanced when the valve 13 allows air from an air pump 14 to enter into the first air chamber 11 and air in the second chamber 12 to be exhausted through a silencer 16 while on the other hand the sleeve 8 is retracted when the valve 13 allows the air from the pump 14 to enter into the second air chamber 12 and the air in the first air chamber 11 to be exhausted through the silencer 16.

Accordingly, the drill 6 is given a rotary motion by the motor 1, and a reciprocating motion through the switching operation of the electromagnetic valve 13. In this connection, it is noted that there is provided above the air cylinder 10 a feed control device (not shown) which is disclosed in U.S. patent applications Ser. Nos. 314,475 and 314,476 both filed on Oct. 23, 1981 and assigned to the assignee of the present application. This device, a part of which engages the reciprocating spindle sleeve 8, controls a feed rate of the sleeve 8.

Figure 4:
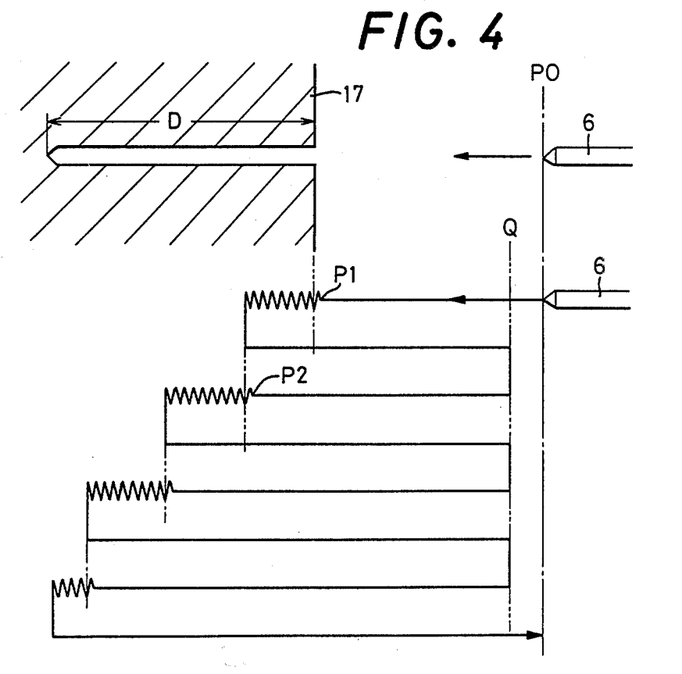
FIG. 4 is a diagrammatic representation of operating movements of a drill on the drilling machine.

The drilling machine having the above described arrangement performs a drilling operation in the following manner: As shown in FIG. 4, the drill 6 located at its original zero position P0 is first advanced at a rapid traverse rate, while rotating, toward a workpiece 17 carried by a workpiece support 17a. At a first feed changing point P1 which is located immediately before a point at which the drill 6 reaches the workpiece 17, the rapid traverse rate in the advancing movement is switched by the said feed control device (not shown) down to an optimum drilling feedrate at which a drilling cut by the drill 6 is initiated. The drill 6 drilling a hole in the workpiece is returned at a rapid traverse rate to a retracted position Q located near the original zero position P0 when a load (cutting resistance) being applied to the spindle 4 carrying the drill 6 exceeds a certain limit during the drilling cut. The drill 6 which has been retracted to the position Q is then advanced again from that position at the rapid traverse rate to a second feed changing point P2 which is located immediately before a point where the drill 6 reaches the depth of the first drilling cut, and the traverse rate is switched down to the optimum drilling feedrate at which the second drilling cut in the same hole is performed in the same way as in the first cut, i.e., the drill 6 is retracted to the retracted position Q at the traverse rate when a cutting resistance being applied to the drill 6 exceeds the predetermined limit.

The above movement of the drill 6 is thus repeated until a predetermined depth D of the hole to be drilled is reached. When the hole is drilled to the predetermined depth D, the drill 6 is returned at the rapid traverse rate to the original zero position P0 and the drilling operation is terminated.

Now, the detailed description refers to a load torque detecting device which detects a driving torque applied to the previously indicated transmission spring 2.

Figures 5, 6, 7:
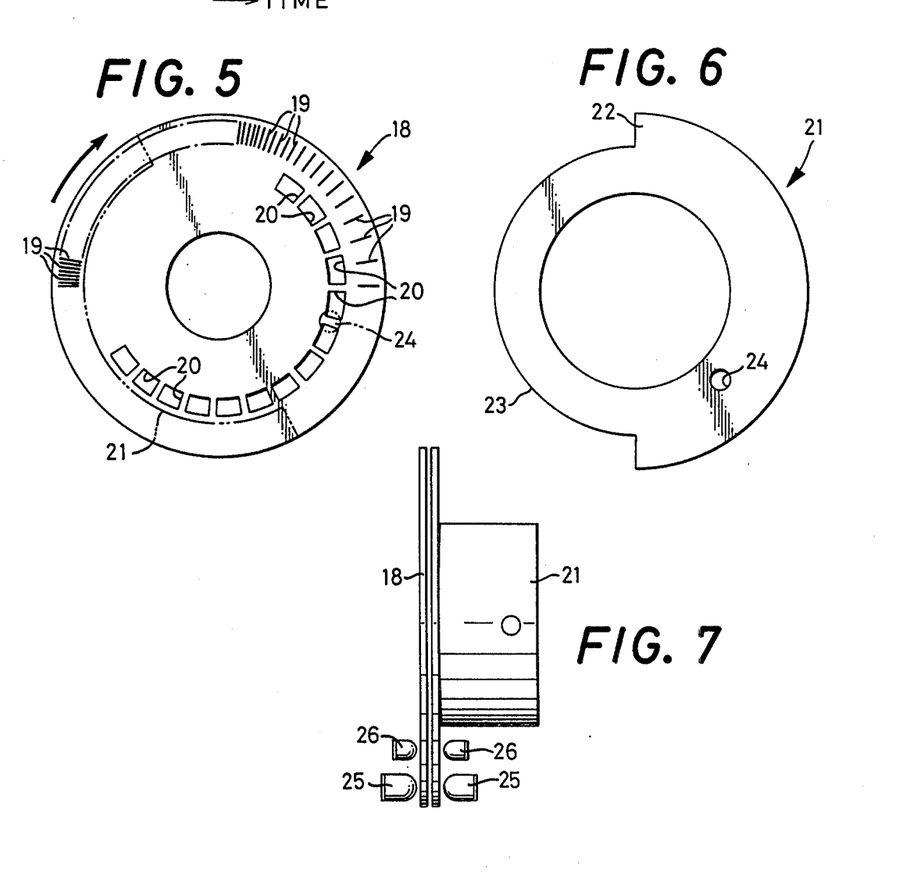
FIG. 5 is an elevational view of a rotary disc of the drilling machine.
FIG. 6 is an elevational view of a covering plate of the drilling machine.
FIG. 7 is a schematic side elevation showing a relative position of the rotary disc to the covering plate.

In FIG. 3, a rotary disc 18 is fixed to the said one end of the spline shaft 3 and rotated therewith. In this preferred embodiment, the rotary disc 18 is provided, as shown in FIG. 5, with a total of eighty-nine (89) slits 19 serving as a sensed portion, which slits are disposed along a circle concentric with the spline shaft 3, the first seventy-one (71) slits as counted in the rotating direction of the disc 18 being equally spaced at an angular interval of 1.5°, and the remaining slits being positioned at an increasing angular interval determined as an exponential function. Also provided in the disc 18 are fourteen (14) substantially rectangular, sectorial, transparent apertures 20 which are disposed along a circle concentric with the shaft 3 with a substantially 131° angular displacement in the disc rotating direction with respect to the said slits 19.

A covering plate 21 is fixed to the drive shaft 1a of the motor 1 such that it faces the rotary disc 18 and rotates with the drive shaft 1a. In this embodiment of the invention, the covering plate 21 facing the rotary disc 18 has a slit covering portion 22 which covers the slits 19, an aperture covering portion 23 which covers the transparent apertures, and a reference hole 24 which is located in radial alignment with the transparent apertures 20. The covering plate 21 is arranged to have a relative position to the rotary disc 18 as indicated by one-dot broken line in FIG. 5 while the drive shaft 1a is at rest (the relative position in this embodiment being such that the slits 19 subsequent to the thirty-second slit are covered by the slit covering portion 22).

An angular displacement detecting photocoupler 25 and a timing photocoupler 26 shown in FIG. 7 are disposed on a support member (not shown) in the machine frame 10a. The angular displacement detecting photocoupler 25 detects each slit 19 of the rotary disc 18 when the slit is moved past the photocoupler 25 during rotation of the disc, and the timing photocoupler 26 detects the reference hole 24 in the covering plate 21 when the hole is past the photocoupler 26 during rotation of the covering plate. The photocoupler 26 is adapted so that its photo-transister is capable of detecting the light emitted from its light emitting diode even when the reference hole 24 is moved past the photocoupler 26 while bridging two adjacent transparent apertures 20 as indicated by one-dot broken line in FIG. 5.

When the main spindle 4 and the drill 6 are rotated under no cutting load while the motor is running with a sufficient stability, the resilient force of the transmission spring 2 causes to balance the position of the covering plate 21 relative to the rotary disc 18 with a slight angular displacement (equivalent to eight slits in this particular embodiment) in the rotating direction, and covering plate 21 rotates at the same speed with the rotary disc 18 without a change in the relative angular displacement between the two. In this embodiment, therefore, the angular displacement detecting photocoupler 25 detects forty (40) slits 19 (40=32+8) during each one rotation of the rotary disc 18 and generates forty (40) pulse detection signals SG1, the same number of signals as the number of the detected slits 19.

When a load torque (for example, a cutting resistance Tx exerted on the drill 6, or a motor driving torque developed when the motor 1 is started to run) is applied to the transmission spring 2, the covering plate 21 is angularly displaced in its rotating direction relative to the rotary disc 18 by an amount proportional to the load torque applied, and an additional number (k) of slits 19 which is equivalent to the amount of angular displacement appear out of the slit covering portion 22 of the covering plate 21. Accordingly, the angular displacement detecting photocoupler 25 detects, in each rotation of the rotary disc 18, that number of slits 19 which includes the said additional number (k), i.e., (40+k) slits, and generates the same number of pulse detection signals SG1, i.e., (40+k) signals SG1 corresponding to the detected slits 19.

The timing photocoupler 26, on the other hand, detects the reference hole 24 which is displaced together with the covering plate 21 and generates a timing pulse signal SG2 before the slits 19 start passing the angular displacement detecting photocoupler 25. Thus, the timing photocoupler 26 always generates the timing pulse signal SG2 before detection by the photocoupler 25 of the slits 19 passing the same in each rotation of the rotary disc 18.

Figure 8:
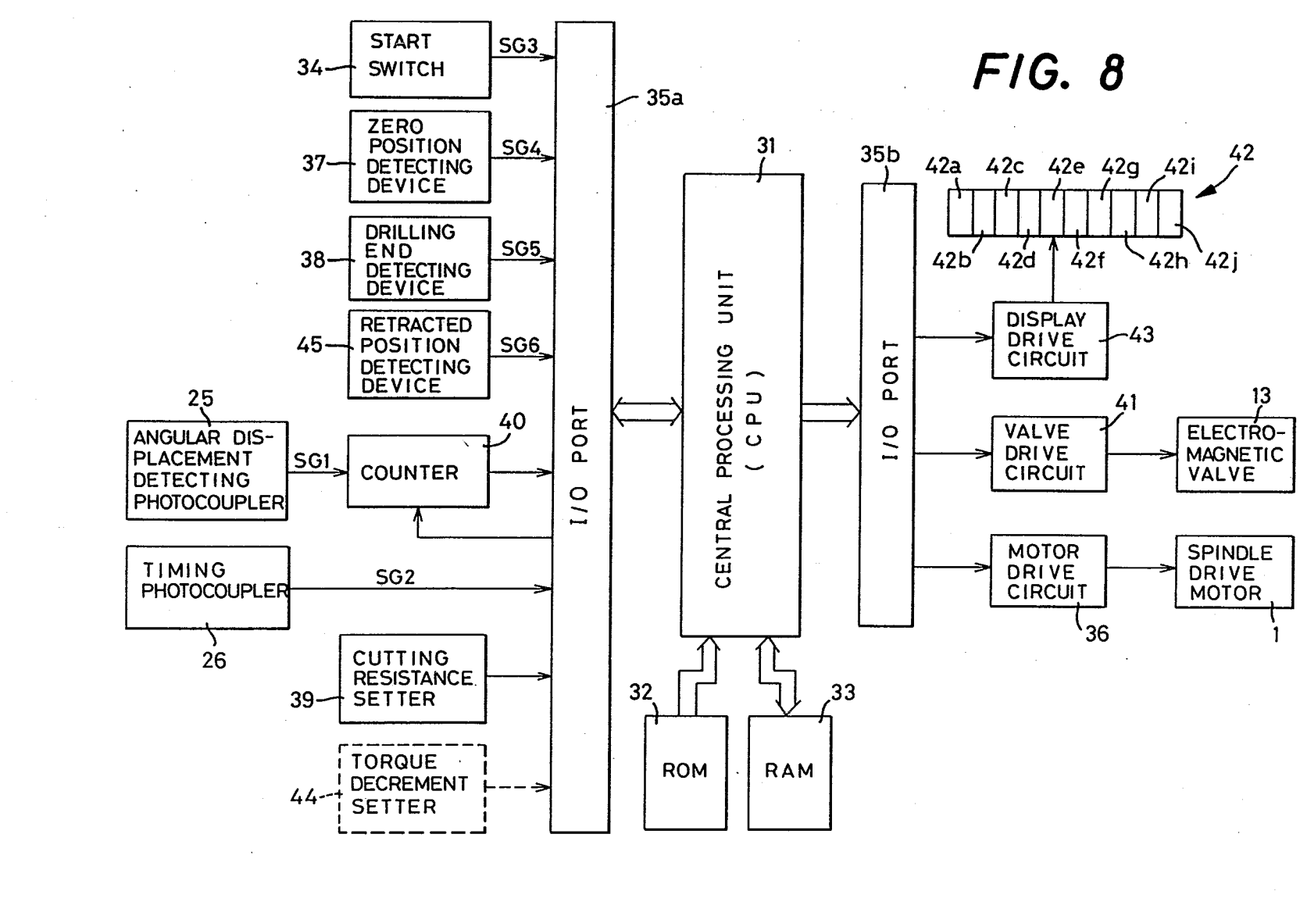
FIG. 8 is a block diagram showing an electrical circuitry of the drilling machine.

Referring next to FIG. 8, there is described a control circuit for controlling the operation of the drilling machine arranged as previously described.

In the figure, a central processing unit 31 (hereinafter referred to as CPU) which serves as control means for the machine constitutes an arithmetic control system, in conjunction with a read-only-memory 32 (hereinafter referred to as ROM) which stores therein program data and other various kinds of data for controlling the drilling machine, and with a random-acess-memory 33 (hereinafter referred to as RAM) which serves as memory means for storing torque data determined based on the pulse detection signals SG1 generated by the said angular displacement detecting photocoupler 25. A start switch 34 provided at a proper position on the machine generates, when it is depressed, a start signal SG3 which is transferred through on I/O port 35a to the CPU31 which, in response to the start signal SG3, generates a motor drive control signal which is transferred to a motor drive circuit 36 through an I/O port 35b to start the motor 1.

A zero position detecting device 37 which consists of a photocoupler or limit switch, generates a zero position signal SG4 when the drill 6 is located at its original zero position P0 shown in FIG. 4, the signal SG4 being transferred to the CPU31 through the I/O port 35a. A drilling end detecting device 38 which consists of a photocoupler or limit switch generates an end position signal SG5 when the drill 6 is advanced to an intended final depth D of a hole to be drilled in the workpiece 17 (when the end of a drilling cut is reached). The signal SG5 is transferred to the CPU31 through the I/O port 35a. A cutting resistance setter 39 is provided at a proper position on the drilling machine. The setter 39 allows the machine operator to set data of a maximum cutting resistance value X1 which is determined depending upon the diameter of the drill 6 used on the machine, and transfer the set data to the CPU31. A retracted position detecting device 45 which consists of a photocoupler or limit switch, generates a drill-retracted signal SG6 when the drill is located at its retracted position Q shown in FIG. 4. The signal SG6 is transferred to the CPU31 through the I/O port 35a.

A counter 40 counts in the adding direction the pulse detection signals SG1 generated by the angular displacement detecting photocoupler 25. A count of the counter 40 is read out by the CPU31 and stored as the torque data at a predetermined address of the RAM33. The timing pulse signals SG2 generated by the timing photocoupler 26 are used as the signals for the CPU31 to read out the count of the counter 40 and clear the counter 40, i.e., the CPU31 reads out the count and stores it in the RAM33 in response to the rise of the timing pulse signal SG2, and subsequently clears the said counter 40.

A valve drive circuit 41 controls the switching operation of the previously described electromagnetic valve 13 according to valve drive control signals supplied from the CPU31 in order to advance and retract the drill 6. A display device 42 consists of ten indicators 42a through 42j which are disposed at a proper location on the drilling machine. These indicators are controlled to be illuminated and flicker according to display drive control signals supplied from the CPU31 to a display drive circuit 43.

Figure 9A:
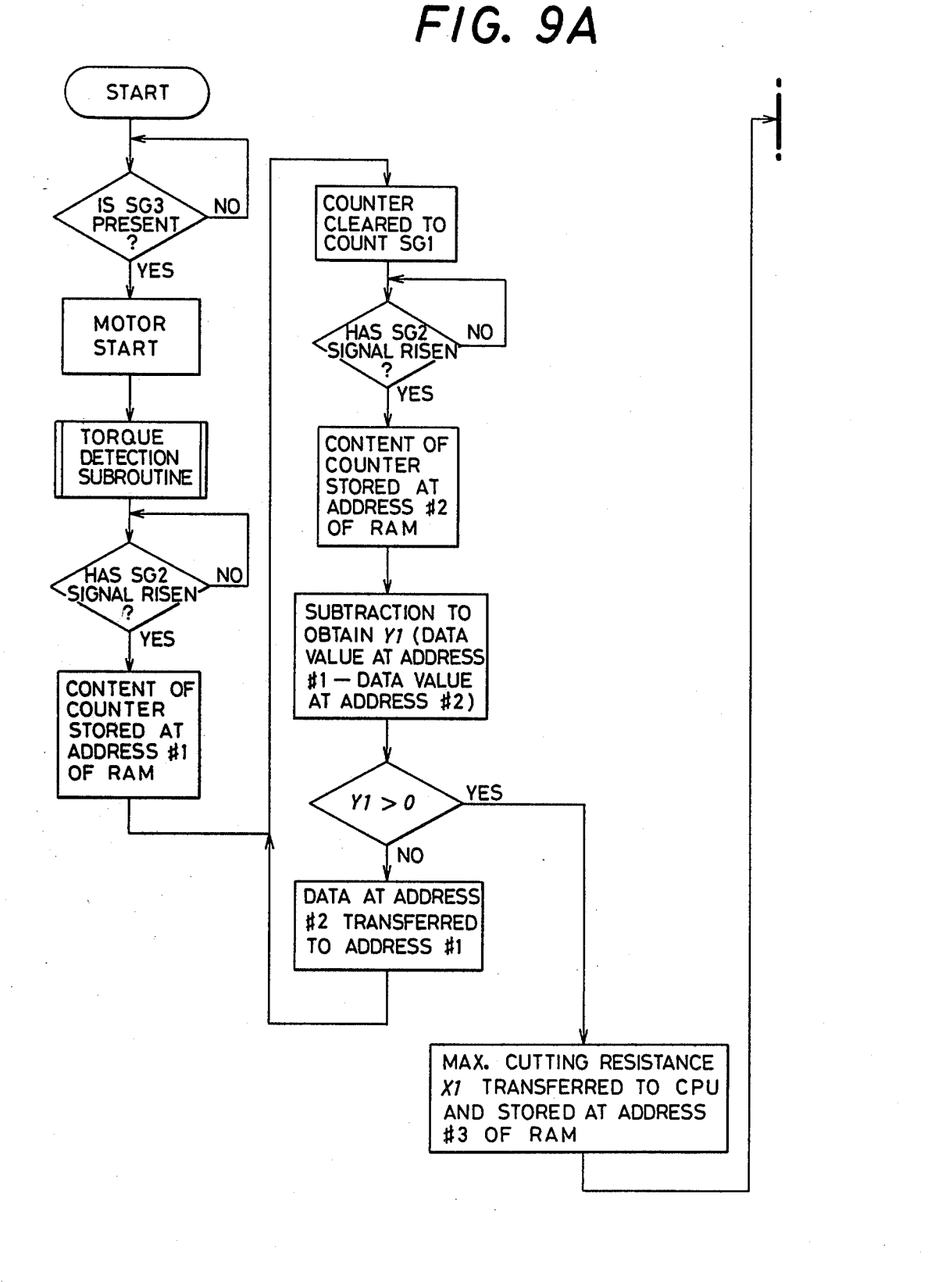
FIGS. 9A and B, 10 and 11 are flow diagrams explaining the arithmetic and processing operation of a central processing unit of the drilling machine.
Figure 9B:
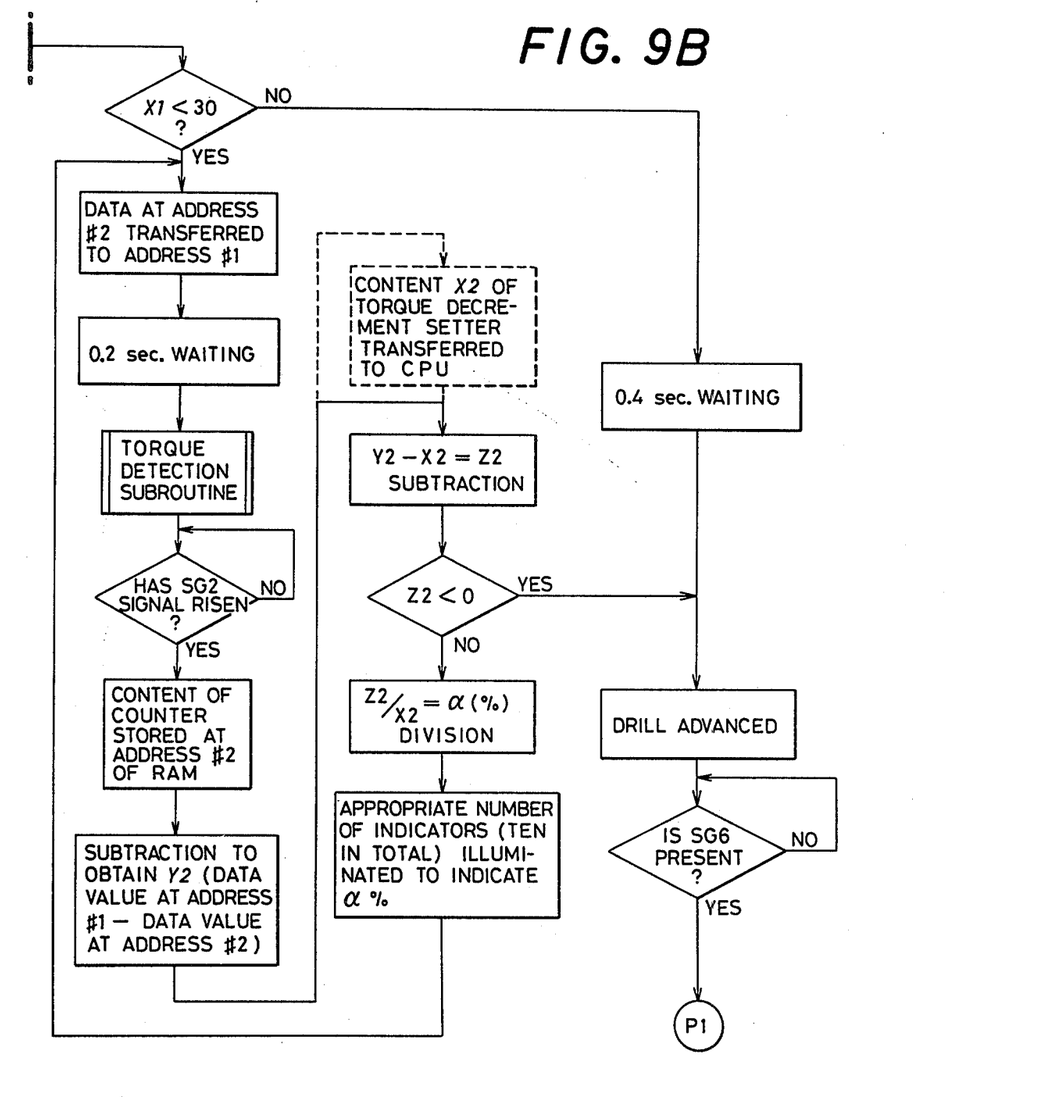
Figure 10:
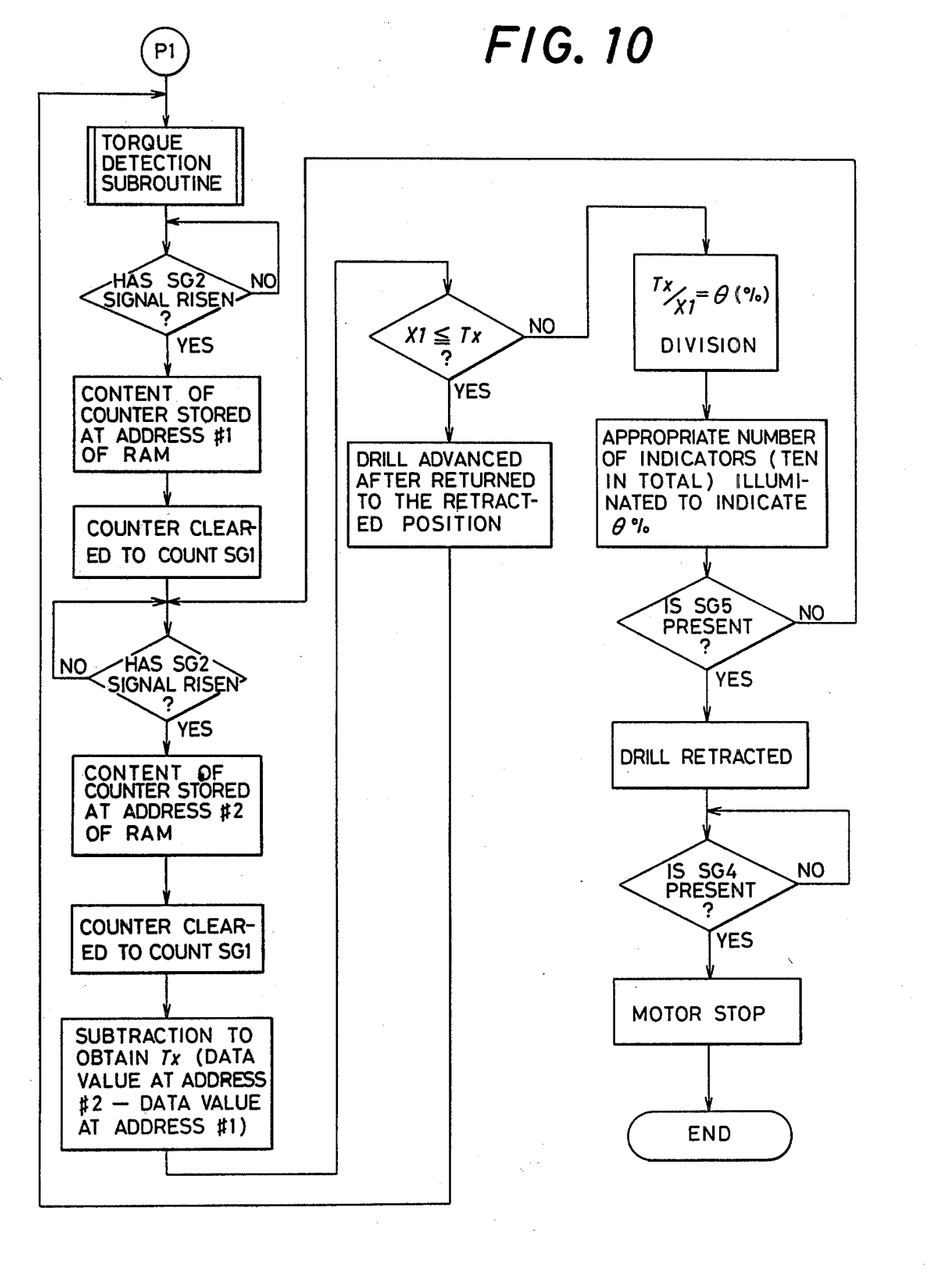
Figure 11:
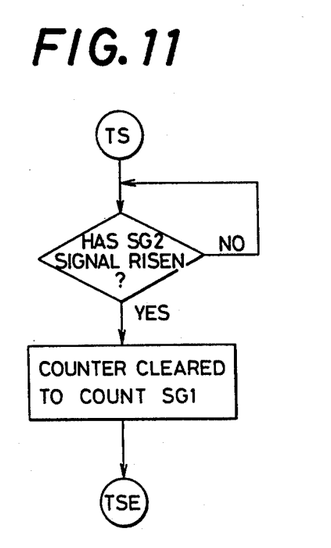

The following description explains the operation of the drilling machine arranged as described above, with reference to the flow diagrams in FIGS. 9 through 11 showing the arithmetic and processing operation of the CPU31.

When the start switch 34 is depressed by the operator while the drill 6 is located at its original zero position P0, the start signal SG3 is fed to the CPU31. In response to this start signal SG3, the CPU31 feeds to the motor drive circuit 36 a motor forward start signal to start the motor 1 in the forward direction. The CPU31 then proceeds with an arithmetic and processing operation according to a torque detection subroutine (as indicated in FIG. 11) to start detecting a drive torque applied to the transmission spring 2.

With the motor 1 started, the rotary disc 18 and the covering plate 21 are started to rotate, whereby the CPU31 first clears the counter 40 in response to the rise of a timing pulse signal SG2 from the timing photocoupler 26 and then directs the counter 40 to count pulse detection signals SG1 generated from the angular displacement detecting photocoupler 25. The counter 40 measures the drive torque being applied to the transmission spring 2 during one rotation thereof by counting the number of the said pulse detection signals SG1. At the end of the counting operation of the counter 40 and upon completion of that one rotation of the transmission spring 2, the timing photocoupler 26 again detects the reference hole 24 in the covering plate 21 and generates another timing pulse signal SG2.

In response to the rise of this another timing pulse signal SG2, the CPU31 reads the content of the counter 40 and stores it at address #1 of the RAM33 as the torque data of the transmission spring 2 during that first rotation. Then, the CPU31 clears the counter 40 and directs it to start counting the number of pulse detection signals SG1 which are generated immediately after the counter 40 has been cleared, thus starting the counter 40 to measure the drive torque to be applied to the transmission spring 2 during the next one rotation thereof. Then, in the same manner as proviously indicated, the counter 40 measures the drive torque applied to the spring 2 in this second rotation and the timing photocoupler 26 generates the next timing pulse signal SG2, in response to the rise of which the CPU31 reads the content of the counter 40 and stores it at address #2 of the RAM33 as the torque data of the transmission spring 2 during that second rotation.

When the torque data during the second rotation has been stored at address #2 of the RAM33, the CPU31 executes an arithmetic operation of subtracting a value T2 of the second torque data stored at address #2 of the RAM33 from a value T1 of the first torque data stored at address #1 of the same and determines whether the result of the subtraction, i.e., the difference Y1 (=T1−T2) is correct or not. This determination on the operation result Y1 by the CPU31 is to judge whether the drive torque value T applied to the transmission spring 2, which first rises upon starting of the motor 1 up to its maximum level Tmax and then falls down gradually into its stable range, has risen to that maximum level Tmax or not. At this point of time right after the start of the motor 1, however, the drive torque value is in the process of rising toward the maximum level Tmax as the transmission spring 2 is accelerated, whereby the said operation result Y1 is negative at this point.

As soon as the CPU31 has determined that the operation result Y1 is still negative, that is, the drive torque value T of the spring 2 has not yet reached its maximum level Tmax, it transfers the second torque data T2 stored at address #2 of the RAM33 to address #1 of the same and at the same time clears the counter 40, directing it to start counting the number of pulse detection signals SG1 from the angular displacement detecting photocoupler 25 in order to start measuring the drive torque to be applied to the transmission spring 2 during the third rotation thereof. In completely the same manner as mentioned above, the drive torque value applied to the spring 2 during that third rotation is obtained and then stored at address #2 of the RAM33 as the torque data whose value T3 is subtracted from the torque data value T2 of the spring during the second rotation for obtaining the difference Y1 (=T2−T3) whereby the determination is made of whether or not the drive torque applied to the transmission spring 2 has reached the maximum level Tmax. Thus, the same steps of arithmetic and processing operation are repeated by the CPU31 until the drive torque of the spring 2 has reached the maximum level Tmax.

When the drive torque applied to the transmission spring 2 has reached the maximum level Tmax (From this point of time, the drive torque begins to enter into a gradually decreasing unstable range.), the CPU31 reads the maximum cutting resistance value X1 preset on the cutting resistance setter 39, stores it at address #3 of the RAM33 and determines whether this resistance value X1 is smaller than a reference value preset within the CPU31. This determination by the CPU31 is to judge whether the diameter of the drill 6 is small or large, i.e., whether the drill 6 is easy to be broken under a low cutting resistance Tx or it is hard to be broken under a high cutting resistance Tx. For convenience of explaining this determination, the said reference value is set at "30" in this specific embodiment wherein the drill 6 is judged to have a large diameter when the maximum cutting resistance value X1 is larger than "30" and have a small diameter when it is smaller than "30".

When the CPU31 determines that the drill 6 has a large diameter, it presents, with a time lapse of 0.4 second (in this embodiment) after the determination, a drill advancing signal to the valve drive circuit 41 for operating the electromagnetic valve 13 and thereby directs to advance the drill 6 from its original zero position P0 to the drilling start position because the drill 6 may not possibly be broken even if it is advanced for drilling at the moment when the drive torque being applied to the transmission spring 2 has fallen from the maximum level Tmax into the unstable range wherein the torque value is gradually decreased.

When the CPU31 determines that the drill 6 has a small diameter, on the other hand, it transfers the torque data at address #2 of the RAM33 into address #1 of the same. With a time lapse of 0.2 second (in this embodiment) after the transfer, the CPU31 executes an arithmetic and processing operation according to the torque detection subroutine and directs the counter 40 to measure in the previously described manner the drive torque applied to the transmission spring 2 0.2 second after the said transfer. In response to the rise of a timing pulse signal SG2 generated from the timing photocoupler 26 after completion of the counting operation of the counter 40, the CPU31 reads the content of the counter 40 and stores it at address #2 of the RAM33 as the torque data of the spring 2 during its rotation 0.2 second after the said transfer.

After completion of the transfer of the torque data into address #2 of the RAM33, the CPU31 executes an arithmetic operation of subtracting a value of the torque data stored at address #2 of the RAM33 from a value of the torque data at address #1 of the same, thereby obtaining the value of variation, i.e., decrease Y2 (decrement value Y2) in the drive torque during the said length of time of 0.2 second while the drive torque is in the gradually decreasing unstable range. Then, the CPU31 performs an arithmetic operation of subtracting from this decremental variation value Y2 a torque decrement reference value X2 which is a second preset value that is either equal to or smaller than, the maximum cutting resistance value X1 preset on the cutting resistance setter 39, and that is predetermined in relation to the resistance value X1, and the CPU31 determines whether the operation result or the difference Z2 (=Y2−X2) is negative or not. This determination on the operation result Z2 is to judge whether or not the drive torque applied to the transmission spring 2 has fallen into the stable range from the gradually decreasing unstable torque range. At this point of time, the drive torque remains in the unstable range wherein the torque is gradually decreased from the maximum level Tmax and consequently the variation or decrement value Y2 is far larger than the torque decrement reference value X2, that is, the result Z2 is positive. In this connection, it is noted that the decrement reference value X2 is set such that a decrement of the drive torque varying as shown in FIG. 1 is not counterbalanced by a cutting resistance Tx exerted on the drill 6 if a drilling cut is started while the drive torque is decreasing, i.e., the reference value X2 is established so as to be a decrement value of the drive torque when the torque is in the stable range. In this embodiment, the decrement reference value X2 is equal to the maximum cutting resistance value X1 preset on the setter 39.

When the CPU31 determines that the subtraction result Z2 is positive, i.e., the drive torque being applied to the transmission spring 2 has not yet fallen into the stable range, it proceeds with an arithmetic operation of dividing the result Z2 by the torque decrement reference value X2 to obtain a torque decrement ratio ($\alpha\%$), i.e., Z2/X2=(Y2−X2)/X2. Based on the obtained decrement ratio ($\alpha\%$), the CPU31 then supplies display control signals to the display drive circuit 43 to illuminate the appropriate ones of the ten indicators 42a through 42j for indicating the decrement ratio ($\alpha\%$). The indicators are sequentially illuminated in the direction from 42a toward 42j. For example, when the decrement ratio is 30% the CPU31 directs the first three indicators 42a, 42b and 42c to be illuminated, and similarly the first six indicators 42a through 42f are illuminated to indicate the decrement ratio of 60%. In this embodiment, the first digits 1 through 9 of a percentage number representing the decrement ratio as in "41%" are discarded. (Therefore, the "41%" is actually indicated as "40%" by illumination of the four indicators 42a through 42d.) In this manner, the machine operator may know how much the drive torque is decreasing (the percentage of the current torque decrement with respect to the reference value) by observing the indicators 42a through 42j for illumination (by counting the number of the illuminated indicators).

In the next step, the CPU31 transfers the torque data stored at address #2 of the RAM33 into address #1 of the same. With the same time lapse of 0.2 second as previously described after the above transfer of the torque data, the CPU31 obtains in the same manner as previously indicated a value of the drive torque applied to the transmission spring 2 0.2 second after the said transfer, stores the obtained torque data at address #2 of the RAM33 and calculates the decrement value Y2. Then, the CPU31 obtains the subtraction result or difference Z2 and determines whether the result Z2 is negative or not. The same steps of arithmetic and processing operation of the CPU31 are repeated until the decrement value Y2 of a drive torque of the transmission spring 2, which is calculated every 0.2 second, has become smaller than the torque decrement reference value X2, that is, until the drive torque has fallen into the stable range. Thus, the memory unit RAM33 is updated at the time interval of 0.2 second by renewing the stored torque data with a newly obtained torque data until the drive torque decrement value Y2 has become smaller than the reference value X2. The torque decrement rate ($a\%$) is indicated through illumination of the indicators 42a through 42j each time the CPU31 repeats the given steps of operation.

When the decrement value Y2 of the drive torque applied to the spring 2 has become smaller than the torque decrement reference value X2 (when the spring torque has been stabilized), the CPU31 supplies a drill advancing signal to the value drive circuit 41 for operating the electromagnetic valve 13 and thereby directs the drill 6 to advance from its original zero position P0 to the drilling start position. Thus, the drill 6 of the drilling machine is not advanced for starting a drilling operation until the drive torque applied to the transmission spring 2 after actuation of the motor 1 has fallen in the stable range.

When the drill 6 has passed the retracted position Q shown in FIG. 4 after its advancement is started, the CPU31 performs an arithmetic and processing operation according to the said torque detection subroutine, directs the counter 40 to measure the drive torque being applied to the spring 2, and reads the count of the counter 40 and stores it at address #1 of the RAM33, in the same manner as previously described. Then, the CPU31 directs the counter 40 to perform the next counting operation for detecting the drive torque to be applied to the spring 2 during the next one rotation thereof. The value of torque data stored at address #1 of the RAM33 at this point of time is accordingly in the stable range and is defined as a drive torque data value $T_{loss}$ which is established while no cutting resistance Tx is being exerted on the drill 6. (This torque data value is hereinafter referred to as loss torque data value $T_{loss}$.)

In the next step, the CPU31 stores in the previously described way the count of the counter 40, i.e., the data on the drive torque applied during the said next one rotation of the spring 2, at address #2 of the RAM33, and clears the counter 40 before directing it to start the next counting operation to detect the drive torque during the following one rotation of the spring 2. Then, the CPU31 proceeds with an arithmetic operation of subtracting the value $T_{loss}$ of the loss torque data stored at address #1 of the RAM33 from the value of the torque data stored at address #2 of the same, calculates a cutting resistance value Tx exerted on the drill 6, reads the maximum cutting resistance value X1 stored at address #3 of the RAM33, and determiner whether the cutting resistance Tx is larger than the maximum cutting resistance value X1. This determination is to judge whether the amount of cutting resistance being exerted on the drill 6 has reached the maximum permissible limit or not.

At this point of time, the drill 6 has just started to advance and is not yet engaged in a drilling cut whereby the above indicated cutting resistance Tx is zero and therefore smaller than the maximum permissible value X1. Hence, the CPU31 then proceeds with calculating the ratio of the cutting resistance Tx currently exerted on the drill 6 to the maximum permissible cutting resistance value X1 (this ratio being hereinafter referred to as resistance increase ratio $\theta\%$) and directs the display device 42 to indicate the current calculated increase ratio ($\theta\%$) through illumination of the appropriate number of the indicators in the same manner as in indicating the torque decrement ratio ($a\%$). At this point of time, however, no indicators 42a through 42j will be illuminated since the cutting resistance Tx is zero as described above. Further, since the drill 6 has not been advanced to its predetermined drilling end or depth and therefore no end position signal SG5 is generated from the drilling end detecting device 38, the CPU31 directs the counter to detect the drive torque applied to the transmission spring 2 during the next one rotation, calculates the cutting resistance Tx and performs other arithmetic and processing operation. The CPU31 repeats the same steps of operation until the drill 6 has been advanced to the drilling end position. During the advancement of the drill 6 to this position, the indicators 42a through 42j are not illuminated because of the absence of the cutting resistance Tx.

When the drill 6 has initiated a drilling cut, the drive torque applied to the transmission spring 2 is increased and accordingly the value of the torque data to be transferred to and stored at address #2 of the RAM33 is increased whereby the cutting resistance value Tx is also accordingly increased. Thus, the resistance increase ratio ($\theta\%$) becomes larger than zero and the appropriate number of the indicators 42a through 42j are illuminated to indicate the current resistance increase ratio ($\theta\%$). Thus, the operator can easily know the ratio of the cutting resistance Tx currently applied to the spring 2 during the drilling cut, to the maximum permissible value X1, by simply observing the indicators 42a through 42j for illumination. The first digits 1 through 9 of a percentage number of the increase ratio ($\theta\%$) as in "41%" are discarded and the "41%" is indicated as "40%" by illumination of the four indicators 42a through 42d.

When the cutting resistance Tx exerted on the drill 6 has becom equal to or larger than the maximum permissible value X1 and the CPU31 recognizes it, the CPU31 supplies a drill retracting signal to the value drive circuit 41 for operating the electromagnetic value 13 and thereby directs the drill 6 to return to its retracted position Q so as to prevent it from being broken or damaged. When the drill 6 has been located at its retracted position Q, the retracted-position detecting device 45 generates a drill-retracted signal, in response to which the CPU31 supplies to the value drive circuit 41 a drill advancing signal to advance the drill 6 again. When the drilling cut is resumed, the CPU31 stores a new loss torque data value $T_{loss}$ at address #1 of the RAM33 in the previously indicated manner, calculates the cutting resistance value Tx according to the calculated value $T_{loss}$, and obtains the resistance increase ratio ($\theta\%$) at that time to indicate the same through illumination of the appropriate ones of the indicators 42a through 42j.

When the drill 6 is advanced to the drilling end position and the entire drilling cycle is completed (when a hole is drilled to an intended depth D), a drilling end position signal SG5 is presented from the drilling end detecting device 38. In response to this end position signal SG5, the CPU31 presents to the valve drive circuit 41 a drill retracting signal to immediately return the drill 6 back to the original zero position P0 at which the zero position detecting device 37 produces a zero position signal SG4. The CPU31 then presents a motor stop signal to the motor drive circuit 36 in order to stop the motor 1, and terminates the drilling cycle with the machine get ready for starting the next drilling cycle on the workpiece 17.

Thus, the control system in this embodiment prevents the drill 6 from advancing until the drive torque applied to the transmission spring 2, the detection of which is necessary for obtaining a cutting resistance Tx exerted on the drill 6, has fallen into the stable range, and allows an exact detection of the cutting resistance Tx according to which the drill 6 is controlled to advance and return for a safer drilling operation without breakage or damage of the drill 6.

The CPU31 according to this invention is also capable of controlling the drilling machine for increased efficiency in different types of drilling jobs. This capability is described as follows: When the CPU31 detects that the said drive torque has fallen from the maximum level Tmax into the gradually decreasing unstable torque range, it compares a maximum cutting resistance value X1 preset on the cutting resistance setter 39 with a reference value preset within the CPU31, that is, the CPU31 determines whether the drill 6 has a diameter large enough to withstand a high cutting resistance or a diameter too small to withstand the high cutting resistance. When the CPU31 determines that the drill 6 has a large diameter, it directs the drill 6, with a time lapse of 0.4 second to start a drilling cycle (to advance for starting a drilling cut) irrespective of a currently detected level of the said drive torque. When the CPU31 determines, on the other hand, that the drill 6 has a small diameter, it prevents the drill 6 from advancing for starting a drilling cut until the said drive torque has fallen into the stable torque range wherein a cutting resistance may be exactly calculated.

Furthermore, due to the previously described display function of this embodiment of a drilling machine that the drive torque decrement ratio ($\alpha\%$) during transition of said drive torque from the gradually decreasing torque range into the stable torque range is calculated and indicated on the display through illumination of the appropriate ones of the indicators 42a through 42j, the machine operator may easily recognize how the drive torque is decreasing and thus expect the timing when the drill 6 is advanced for starting a drilling cut.

While in this embodiment the said torque decrement reference value X2 is equal to a maximum cutting resistance value X1 preset on the cutting resistance setter 39, it is possible that the torque decrement reference value X2 is set as required by the machine operator with a second setter, i.e., a torque decrement setter 44 (indicated by a broken line block in FIG. 8) provided at a proper location on the drilling machine, the output of the second setter being provided to the CPU31.

When the torque decrement setter 44 is provided, the CPU31 performs an arithmetic and processing operation according to the flow diagram shown by broken lines in FIG. 9A and 9B. In more detail, the CPU31 reads a torque decrement reference value X2 preset on the decrement setter 44 after it calculates a decrement value Y2, and obtains a subtraction result Z2 (difference Z2) by subtracting the value X2 from the value Y2. Thus, the provision of the decrement setter 44 permits drilling operations to be adapted to different diameters of the drill 6 to be used.

Figure 12:
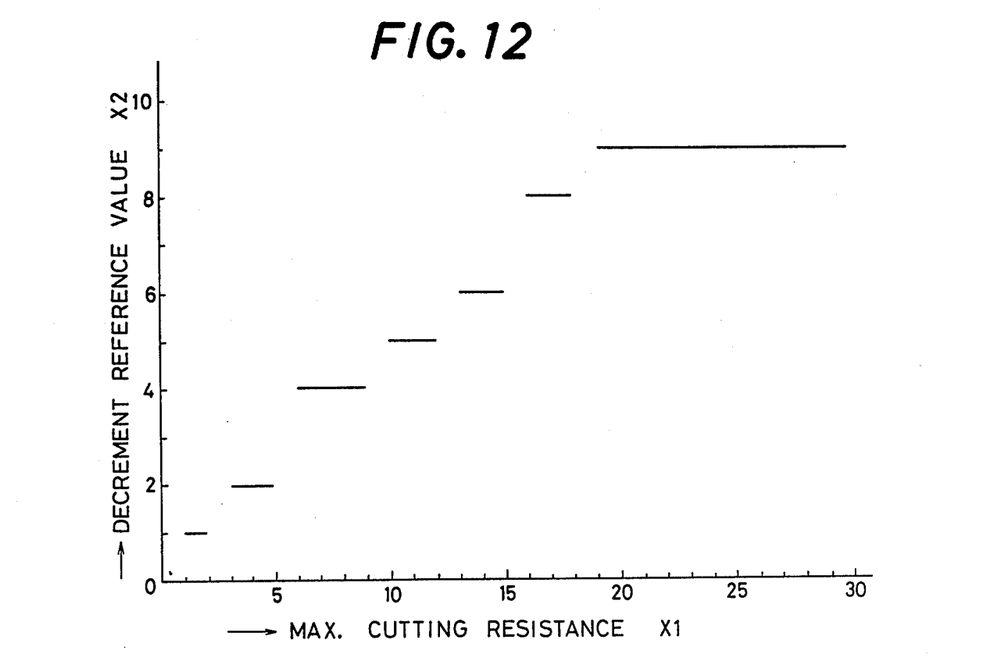
FIG. 12 is a graph representing a relationship between a maximum cutting resistance $X1$ and a torque decrement reference value $X2$ in another embodiment of the invention.

It will be appreciated that the said torque decrement reference value X2 is preset in relation to the maximum cutting resistance value X1 as represented in FIG. 12, the preset values X2 being stored in the ROM32 and read out in response to the specific value X1 preset on the cutting resistance setter 39.

Figure 13:
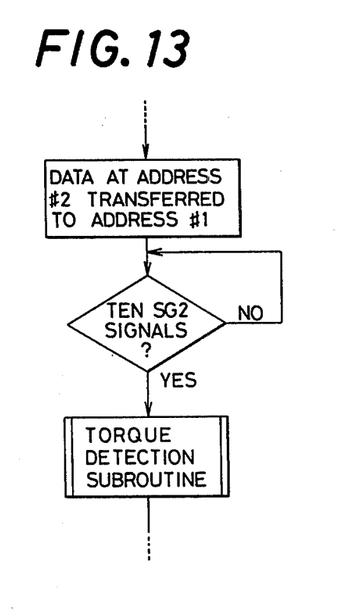
FIG. 13 is a flow diagram explaining the arithmetic and processing operation of the central processing unit used in still another embodiment of the invention.

Although in the previous embodiment the drive torque is detected every 0.2 second to obtain the torque decrement value Y2 by means of detecting an amount of torsion of the transmission spring 2, it is alternatively possible that the torque decrement value Y2 is obtained by means of detecting the drive torque after ten signals SG2 have been presented as shown in the flow diagram in FIG. 13 which is a part of FIG. 9 with a change associated with the sequence of checking if the ten signals SG2 have been presented or not.

Having described specific embodiments of this invention, it is believed obvious that modification and variation of the invention may be made in light of the above teachings without departing from the scope of the appended claims.

What is claimed is:

1. A machine tool comprising:
   a frame;
   a tool support mounted on the frame;
   a tool carried by the tool support;
   first drive means for effecting a relative linear movement between the tool support and a workpiece supported on the frame;
   second drive means for rotating one of the tool and the workpiece relative to the other;
   detecting means, disposed between the second drive means and said one rotated thereby, for detecting a load torque applied to the rotated one and producing a load signal responsive to a magnitude of the detected load torque;
   a start switch for producing a start signal to actuate the second drive means; and
   control means, connected to said first and second drive means, said torque detecting means and said start switch, for controlling said first and second drive means, said control means actuating said second drive means upon receipt of said start signal, calculating a variation in the detected load torque during the actuation of said second drive means, actuating said first drive means to effect said relative linear movement in a direction to cause contact of the tool with the workpiece when the calculated value of said variation has decreased down to a first value after the actuation of the second drive means, obtaining a cutting resistance being exerted on the tool by calculating a difference between a currently detected load torque and a load torque detected after the actuation of said first drive means and before said contact of the tool, and reversing the actuating direction of said first drive means to effect said relative linear movement in a direction to cause separation of the tool and the workpiece away from each other in the event said difference has exceeded a second value, whereby the reversal of said actuating direction is determined by the actual cutting resistance which is exactly calculated based on the total load torque minus the non-cutting load torque which has been substantially stabilized after its initial period of decrease.

2. A machine tool comprising:
   a frame;
   a tool support mounted on the frame;
   a tool carried by the tool support;
   first drive means for effecting a relative linear movement between the tool support and a workpiece supported on the frame;

second drive means for rotating one of the tool and the workpiece relative to the other;

detecting means, disposed between the second drive means and said one rotated thereby, for detecting a load torque applied to the rotated one and producing a load signal responsive to a magnitude of the detected load torque;

memory means for storing said load signal from said detecting means;

a start switch for producing a start signal to actuate the second drive means; and control means for controlling said first and second drive means and said memory means, said control means actuating said second drive means upon receipt of said start signal, calculating a variation in the detected load torque during actuation of said second drive means by subtracting from a value of the stored load signal a value of a current load signal which is produced from the detecting means a predetermined length of time after the production of the stored load signal, updating said memory means by renewing the stored load signal with said current load signal when the calculated value of the variation is greater than a first predetermined value, repeating at intervals of said predetermined length of time both the calculation of said variation between the values of the two successive load signals and the renewal of the previously stored load signal with the currently produced load signal until said calculated value of the variation has decreased down to said first predetermined value, actuating said first drive means to effect said relative linear movement in a direction to cause contact of the tool with the workpiece when the calculated value of said variation has decreased down to said first predetermined value, obtaining a cutting resistance exerted on the tool by calculating a difference between the value of a currently detected load torque and the renewed value of the load signal stored in said memory means, and reversing the actuating direction of said first drive means to effect the relative linear movement in a direction to cause separation of the tool and the workpiece away from each other when said difference has exceeded a second predetermined value.

3. A machine tool according to claim 1 further comprising first manual means for setting said first value as desired, and second manual means for setting said second value as desired.

4. A machine tool according to claim 3, wherein when said second value set by said second manual setting means is greater than a predetermined value, said control means actuates said first drive means in said direction to cause said contact of the tool with the workpiece a predetermined length of time after the actuation of said second drive means irrespective of whether or not said variation has decreased to said first value.

5. A machine tool according to claim 1 further comprising
manual means for setting said second value as desired, and
memory means for storing, as said first value, reference values predetermined in relation to different magnitudes of said second value, and
wherein said control means reads one of said reference values in said memory means in response to the specific magnitude of said second value set by said manual setting means.

6. A machine tool comprising:
a frame;
a tool support mounted on the frame;
a tool carried by the tool support;
first drive means for effecting a relative linear movement between the tool support and a workpiece supported on the frame;
second drive means for rotating one of the tool and the workpiece relative to the other;
detecting means, disposed between the second drive means and said one rotated thereby, for detecting a load torque applied to the rotated one and producing a load signal responsive to a magnitude of the detected load torque;
memory means for storing said load signal from said detecting means;
means for detecting the number of rotation of said rotated one of the tool and the workpiece;
a start switch for producing a start signal to actuate the second drive means; and
control means for controlling said first and second drive means and said memory means,
said control means actuating said second drive means upon receipt of said start signal, calculating a variation in the detected load torque during actuation of said second drive means by subtracting from a value of the stored load signal a value of a current load signal which is produced from the detecting means a predetermined number of rotation of said rotated one after the production of the stored load signal, updating said memory means by renewing the stored load signal with said current load signal when the calculated value of the variation is greater than a first predetermined value, repeating at intervals of said predetermined number of rotation both the calculation of said variation between the values of the two successive load signals and the renewal of the previously stored load signal with the currently produced load signal until said calculated value of the variation has decreased down to said first predetermined value, actuating said first drive means to effect said relative linear movement in a direction to cause contact of the tool with the workpiece when the calculated value of said variation has decreased down to said first predetermined value, obtaining a cutting resistance exerted on the tool by calculating a difference between the value of a currently detected load torque and the renewed value of the load signal stored in said memory means, and reversing the actuating direction of said first drive means to effect the relative linear movement in a direction to cause separation of the tool and the workpiece away from each other when said difference has exceeded a second predetermined value.

7. A machine tool according to claim 1 further comprising means for indicating the value of said variation in the load torque.

8. A machine tool according to claim 7, wherein said control means directs said indicating means to indicate a ratio of a difference between the value of said variation and said first value, to said first value.

9. A machine tool according to claim 7, wherein said control means directs said indicating means to indicate a ratio of a difference between the value of said variation and said first value, to said first value, before the actuation of said first drive means, and a ratio of said difference between the currently detected load torque and the load torque detected after the actuation of said first drive means and before said contact of the tool, to said second value, after the actuation of said first drive means.

10. A machine tool comprising:
a frame;
a tool support linearly movably mounted on the frame;
a tool rotatably carried by the tool support;
first drive means for advancing and retracting the tool support toward and away from a workpiece supported on the frame;
second drive means for rotating the tool about an axis thereof;
detecting means, disposed between the tool and the second drive means, for detecting a load torque applied to the tool and producing a load signal responsive to a magnitude of the detected load torque;
a start switch for producing a start signal to actuate the second drive means for starting the rotation of the tool; and
control means, connected to said first and second drive means, said detecting means and said start switch, for controlling said first and second means, said control means actuating said second drive means upon receipt of said start signal, calculating a variation in the detected load torque during the rotation of the tool, actuating said first drive means to advance the tool support when the calculated value of said variation has decreased down to a first value after the tool has started the rotation, obtaining a cutting resistance being exerted on the tool by calculating a difference between a currently detected load torque and a load torque detected after the advancement of the tool support and before contact of the tool with the workpiece, and reversing the actuating direction of said first drive means to retract the tool support in the event said difference has exceeded a second value, whereby the reversal of said actuating direction is determined by the actual cutting resistance which is exactly calculated based on the total load torque minus the non-cutting load torque which has been substantially stabilized after its initial period of decrease.

11. A machine tool according to claim 10 further comprising
memory means for storing said load signal from the torque detecting means, and
wherein said control means directs the memory means to store therein said load signal from the torque detecting means, calculates the value of said variation in the detected load torque by subtracting from a value of the stored load signal a value of a current load signal which is produced from the torque detecting means a predetermined length of time after the production of the stored signal, updates the memory means by renewing the stored load signal with said current load signal when the calculated value of the variation is greater than said first value, and repeats at intervals of said predetermined length of time both the calculation of said variation between the values of the two successive load signals and the renewal of the previously stored load signal with the currently produced load signal until said calculated value of the variation has decreased down to said first value.

12. A machine tool according to claim 10 further comprising first manual means for setting said first value as desired, and second manual means for setting said second value as desired.

13. A machine tool according to claim 12, wherein when said second value set by said second manual setting means is greater than a predetermined value said control means actuates said first drive means for advancing said tool support toward the workpiece a predetermined length of time after the rotation of the tool irrespective of whether or not said variation has decreased to said first value.

14. A machine tool according to claim 10 further comprising
manual means for setting said second value as desired, and
memory means for storing, as said first value, reference values predetermined in relation to different magnitudes of said second value, and wherein said control means reads one of said reference values in said memory means in response to the specific magnitude of said second value set by said manual setting means.

15. A machine tool according to claim 10 further comprising
memory means for storing said load signal from the torque detecting means, and
means for detecting the number of rotation of the tool, and
wherein said control means directs the memory means to store therein said load signal from the torque detecting means, calculates the value of said variation in the detected load torque by subtracting from a value of the stored load signal a value of a current load signal which is produced from the torque detecting means when the tool has been rotated a predetermined number after the production of the stored load signal, updates the memory means by renewing the stored load signal with said current load signal when the calculated value of the variation is greater than said first value, and repeats at intervals of said predetermined number of rotation of the tool both the calculation of said variation between the values of the two successive load signals and the renewal of the previously stored load signal with the currently produced load signal until said calculated value of the variation has decreased down to said first value.

16. A machine tool according to claim 10 further comprising means for indicating the value of said variation in the torque load.

17. A machine tool according to claim 16, wherein said control means directs said indicating means to indicate a ratio of a difference between the value of said variation and said first value, to said first value.

18. A machine tool according to claim 16, wherein said control means directs said indicating means to indicate a ratio of a difference between the value of said variation and said first value, to said first value, before the advancement of the tool support, and a ratio of said difference between the currently detected load torque and the load torque detected after the advancement of the tool support and before contact of the tool with the workpiece, to said second value, after the advancement of the tool support.

* * * * *